United States Patent Office

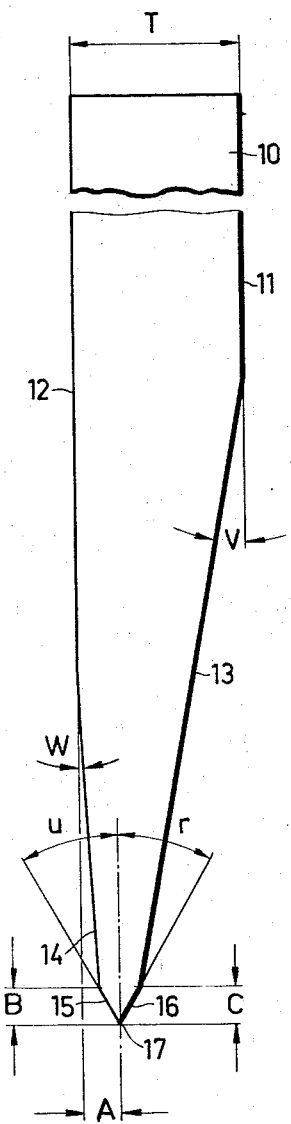

3,292,478
Patented Dec. 20, 1966

3,292,478
CUTTING DIE KNIFE FOR TEXTILES, LEATHER
AND SIMILAR SHEET MATERIALS
Hilding Adolf Falk, Sandviken, and Bo Gunnar Carlsson, Nasbypark, Sweden, assignors to Sandvikens Jernverks Aktiebolag, Sandviken, Sweden, a corporation of Sweden
Filed Oct. 11, 1965, Ser. No. 494,591
4 Claims. (Cl. 83—679)

The present invention pertains to a cutting die knife cutting packets of sheet materials as textiles, leather, paper and similar, especially for the purpose of cutting workpiece blanks for manufacture of clothes, shoes, etc. For such cutting the knife is bent to a shape corresponding to the desired shape of the blank and usually forms a closed figure. Previous knives of this kind have been afflicted with the disadvantage that they are subjected to lateral forces which strive to deform the knife, the workpieces thus deviating from the desired size. It has been tried to prevent said deformation by braces, but this has not been sufficient and furthermore it is desirable to avoid use of braces, as they form an obstacle to the cutting procedure and the removal of workpieces from the knife.

An object of the present invention is to provide a cutting die knife in which the lateral forces are balanced against each other in such a way that the resulting lateral force becomes small enough to avoid the necessity of bracing the knife. This is achieved by aid of suitably inclined surfaces on both sides of the knife adjoining the cutting edge portion preferably in combination with an eccentric position of the cutting edge.

The invention is closer illustrated in the following specification and in the enclosed drawing, showing a cross section of a cutting die knife according to the invention.

The figure shows a cross section of a cutting die knife 10 on an enlarged scale. The knife has two parallel upper side surfaces 11 and 12, two intermediate inclined, downwardly converging surfaces 13 and 14 and two cutting edge surfaces 15 and 16 forming the cutting edge 17. The cutting edge surfaces converge with a greater angle than the intermediate surfaces. The inclination of the latter is chosen in such a way that, when cutting a packet of for instance textiles, the lateral pressures from the packet acting on both intermediate surfaces compensate each other, the resulting lateral force becoming as small as possible. The cutting edge should preferably be eccentric in relation to the upper parallel surfaces, the perpendicular distance A of the cutting edge to the surface 12 being 0.15–0.35 of the thickness T of the knife.

The intermediate surface 13 adjoining the side surface 11, which is more remote from the cutting edge than the other side surface 14, should be inclined an angle "v" greater than the inclination "w" of the side surface 14. The angle "v" is suitably 8–12°, preferably 9–11°, and the angle "w" is suitably 1–5°, preferably 2–4°, said angles being measured in relation to the direction of the parallel surfaces 11 and 12. The height of the surface 13 then often becomes approximately twice the height of the surface 14. The cutting edge surfaces 15 and 16 are inclined by angles "u" and "r" which together are suitably 50–60°. The angles "u" and "v" are preferably at least approximately equal, each angle being 25–30°. The heights B and C of the cutting edge surfaces are approximately equal and lie preferably within the range 0.15–0.5, suitably 0.2–0.35 of the thickness T of the knife. All the surfaces are generally plane but can be somewhat curved.

In case the knife is made of strip rolled material it usually has a thickness of 1.5–3 mm. and a height of 14–100 mm. Forged knives can be somewhat thicker, up to 5 mm. with a height of 50–100 mm. The invention is especially suitable for strip rolled knives, the surfaces 13 and 14 usually being formed during the rolling, the cutting edge surfaces 15 and 16 being ground at a later stage, often after hardening of the knife. The cutting edge portion can possibly be separately hardened, for instance by high frequence induction hardening. It is for instance possible to harden the whole triangular cross section between the cutting edge surfaces 15 and 16 or only a lower portion thereof including the cutting edge 17. If such separate hardening is performed, the rest of the knife may in certain cases need no preceding hardening. The material in the knife can be for instance carbon steel.

As a rule the knife forms a closed figure. In previous knives of this kind the cutting edge has in some cases been centrally positioned between the side surfaces. This has caused the knife to bend outwardly because of the pressure from the workpieces within the knife.

Other knives have had an inclined surface above the cutting edge portion at the outside of the knife, which has resulted in inward flexion of the knife. According to the invention there should be inclined surfaces above the cutting edge portion on both sides of the knife, the inclination angles of said inclined surfaces being substantially different in order to counteract the different pressures from the workpieces. Furthermore the cutting edge should preferably be eccentric, i.e., situated substantially closer to one of the side surfaces, especially the one which adjoins the inclined surface having the smallest angle of inclination.

As an example of a knife according to the invention the following can be mentioned. The thickness $$T = 2.07 \pm 0.05 \text{ mm.}$$

The total height $= 31.80 \pm 0.08$ mm. The distance between the cutting edge and the lower edge of the parallel side-surfaces is 8.0 and 4.65 mm., the inclination of the intermediate surfaces being 10° and 3° respectively. The height B and C of the cutting edge surfaces is 0.63 mm., both surfaces having same inclination, 27.5°. The distance A between the cutting edge and the nearest side surface is 0.5 mm.

The knife according to the invention is in the first place useful for cutting textiles but can also be used for cutting other materials as leather, paper, plastics and similar.

We claim:
1. Cutting die knife for cutting packets of textiles, paper and similar materials, said knife consisting of a plate or a strip having a rear portion with substantially parallel side surfaces (11, 12), a fore cutting edge portion formed by two converging cutting edge surfaces and between said side surfaces and cutting edge surfaces two generally plane intermediate surfaces which converge towards the cutting edge portion with an angle which is smaller than the angle between the cutting edge surfaces, the intermediate surfaces having different angles of inclination in relation to the parallel side surfaces the cutting edge being situated closer to one of the side surfaces than to the other and the intermediate surface which adjoins that side surface which is closer to the cutting edge being inclined 1–5°, and the other intermediate surface being inclined 8–12°, in relation to the parallel side surfaces, the perpendicular distance of the cutting edge to the nearest side surface being 0.15–0.35 of the thickness of the knife between the parallel side surfaces.

2. Cutting die knife according to claim 1, in which the cutting edge surfaces each are inclined 25–30° in relation to the parallel side surfaces.

3. Cutting die knife according to claim 1, in which each cutting edge surface has a height, which measured in the height direction of the knife is 0.15–0.5 of the thickness of the knife between the parallel side surfaces.

4. Cutting die knife according to claim 1 in which the cutting edge portion, limited by the cutting edge surfaces, is at least partly hardened to a higher hardness than the rest of the knife, the hardened portion comprising the cutting edge.

References Cited by the Applicant

UNITED STATES PATENTS 2,211,213  8/1940  Lindholm.

WILLIAM W. DYER, Jr., *Primary Examiner.*

JAMES MEISTER, *Assistant Examiner.*